H. M. CARPENTER & E. GRIMSHAW.
Swinging Buggy-Bodies.
No. 163,454.        Patented May 18, 1875.
FIG. I.
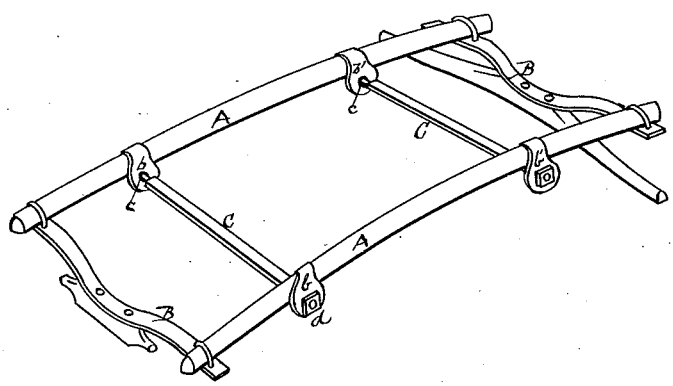
FIG. II.
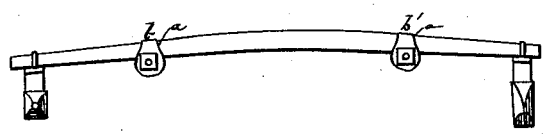
FIG. III.
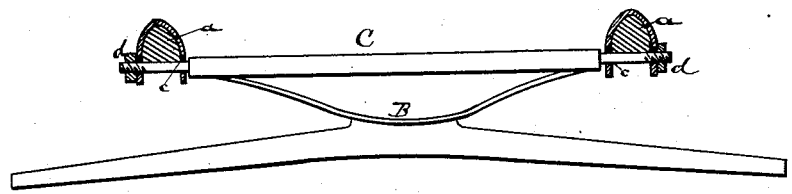
WITNESSES
F. B. Townsend
Will. H. Mixon
INVENTORS.
Herbert M Carpenter
Ellwood Grimshaw
by A. H. Evans & Co
Attys.
THE GRAPHIC CO.PHOTO-LITH.39 & 41 PARK PLACE,N.Y.

UNITED STATES PATENT OFFICE.

HERBERT M. CARPENTER AND ELLWOOD GRIMSHAW, OF MINNEAPOLIS, MINNESOTA.

IMPROVEMENT IN SWINGING BUGGY-BODIES.

Specification forming part of Letters Patent No. 163,454, dated May 18, 1875; application filed March 30, 1875.

*To all whom it may concern:*

Be it known that we, HERBERT M. CARPENTER and ELLWOOD GRIMSHAW, of Minneapolis, Minnesota, have invented certain new and useful Improvements in Rubber Springs for Vehicles; and we hereby declare the following to be a full, clear, and exact description thereof, reference being had to the accompanying drawings making a part of this specification, in which—

Figure 1 represents a perspective view of a frame-work with our improvement attached. Fig. 2 represents a side elevation of same. Fig. 3 shows a cross-section through $y\ y$.

The object of our invention is to produce a cheap and effective mode of mounting vehicle-bodies on springs; and it consists in supporting the carriage-body upon cross-bars suspended by rubber straps which pass over the thorough-braces, as hereinafter more fully set forth.

In order that those skilled in the art may make and use our invention, we will proceed to describe the exact manner in which we have carried it out.

In the said drawings, A A are thorough-braces, which usually support the body of this class of vehicles, and having their ends resting on bow-springs B B, supported by the running-gear. The thorough-braces A A have slight offsets $a\ a$, and within them rest rubber straps $b\ b'$, that lap over the thorough-braces.

These rubber straps are provided with holes $c\ c$ in their ends. The cross-bars C C have their bearings in the holes $c\ c$ in the straps $b\ b'$, and are secured in position by the nuts $d\ d$, the ends of which are secured by clips to springs B B. The body of the vehicle is mounted upon the bars C C, and, through the rubber straps $b\ b'$ and steel springs B B, is secured an easy and comfortable movement upon the running-gear.

We are aware that rubber springs as applied to vehicles are not new, as the same have been applied in the shape of rings sustained by clasps and hooks; but we are not aware that the same has been applied in combination with steel springs in the simple and substantial manner herein set forth. We are also aware that the cross-pieces have been connected with the thorough-braces by means of steel springs; but this is not our invention.

Having thus described our invention, what we claim as new, and desire to secure by Letters Patent, is—

The rubber straps $b\ b'$, provided with the holes $c\ c$, in combination with the thorough-braces A A, cross-bars C C, and steel springs B B, substantially as described.

HERBERT M. CARPENTER.
ELLWOOD GRIMSHAW.

Witnesses:
HENRY M. WILLIAMSON,
H. W. WAYNE.